United States Patent [19]
Imai et al.

[11] 3,898,282
[45] Aug. 5, 1975

[54] METHOD FOR PRODUCING α-AMINOCYCLOHEXANONE OXIME

[75] Inventors: Yoshiharu Imai, Chita; Yoshihisa Matsukuma; Shinzo Imamura, both of Nagoya, all of Japan

[73] Assignee: Toray Industries, Inc., Tokyo, Japan

[22] Filed: May 21, 1974

[21] Appl. No.: 472,064

[30] Foreign Application Priority Data
May 24, 1973   Japan ......................... 48-57187

[52] U.S. Cl. ............................................ 260/566 A
[51] Int. Cl. ............................................ C07c 31/04

[58] Field of Search ................................. 260/566 A

[56] References Cited
UNITED STATES PATENTS
3,839,448   10/1974   Imamura et al ................ 260/566 A

*Primary Examiner*—Gerald A. Schwartz

[57] ABSTRACT

Method for producing α-aminocyclohexanone oxime by reacting bis(2-chloro-1-nitrosocyclohexane) with ammonia in the presence of a mineral acid salt of hydroxylamine.

5 Claims, No Drawings

METHOD FOR PRODUCING α-AMINOCYCLOHEXANONE OXIME

GENERAL FIELD OF THE INVENTION

This invention relates to a method for producing α-aminocyclohexanone oxime by reacting bis(2-chloro-1-nitrosocyclohexane) with ammonia in the presence of a mineral acid salt of hydroxylamine at elevated temperature under pressure.

α-aminocycloalkanone oximes are useful raw materials. For example, such a compound can be converted to α-amino lactam by Beckmann's rearrangement and useful amino acids can be obtained by hydrolysis of the resulting products.

α-aminocyclohexanone oxime is an especially important raw material for the production of lysine, which is one of the essential amino acids.

DISCUSSION OF THE PRIOR ART

Heretofore, various methods for producing α-aminocycloalkanone oxime have been suggested. For example, these include (1) reacting alicyclic α-acyloxy oxime with ammonia or a primary or secondary amine (Japanese patent publication No. 42-23177), and reacting 2-chlorocyclohexanone with hydroxylamine in liquid ammonia (Japanese patent publication No. 44-21704). Further, for producing α-aminocyclododecanone oxime, a method (3) has been suggested comprising reacting α-chlorocyclododecadienone oxime with a primary or secondary amine and reducing the resulting product with hydrogen (Japanese patent publication No. 42-10501).

However, the method (1), which consists of (a) reacting an unsaturated alicyclic hydrocarbon with nitrosyl chloride to form α-chloro oxime, (b) reacting the resulting product with a metal carboxylate such as sodium acetate and (c) amination of the acyloxy radical at the α-position of the resulting product with ammonia or amine, is quite complicated. Further, this process has the further drawback that the resulting α-aminocycloalkanone oxime tends to enter into a side reaction during the main reaction to form a dioxime having a secondary amino group. Therefore, it is difficult to obtain the desired compound only.

The aforementioned method (2) is undesirable with respect to the yield of the desired compound.

The method (3) in which α-chloro oxime is employed as a starting material, and also the method (1) are also undesirable because of the limited yield of the desired compound.

On the other hand, we have proposed, as disclosed in U.S. application Ser. No. 84,201, now U.S. Pat. No. 3,839,448, granted Oct. 1, 1974, a novel method in which a bis(2-chloro-1-nitrosocyclohexane) may be reacted with ammonia at an elevated temperature to form a cyclohexanone oxime having a primary amino group at its α-position. A high yield is obtained. It is accordingly an object of this invention to provide a method for producing αaminocyclohexanone oxime in extremely high yield.

A further object of this invention is to improve upon the method disclosed in our aforesaid U.S. Pat. No. 3,839,448 for obtaining α-aminocyclohexanone oxime in far higher yield.

Other objects and advantages of this invention will become further apparent hereinafter.

SUMMARY OF THE INVENTION

It has now been found that the reaction between a bis(2-chloro-1-nitrosocyclohexane) and ammonia may be improved by the presence of a mineral acid salt of hydroxylamine to form a cyclohexanone oxime having a primary amino group at its α-position in extremely high yield.

DETAILED DESCRIPTION OF THE INVENTION

The objects of this invention have been achieved by reacting 1 mol bis(2-chloro-1-nitrosocyclohexane) with at least 20 moles of ammonia in the presence of at most 2 moles of salt of mineral acid hydroxylamine per mol of bis(2-chloro-1-nitrosocyclohexane) at 40°–100°C. under pressure.

The starting material, bis(2-chloro-1-nitrosocyclohexane) is represented by the following formula:

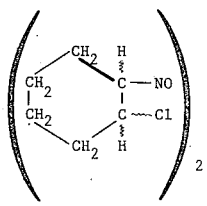

wherein " " represents stereo isomerism.

The starting material can be produced by well known conventional methods, for example, by reacting cyclohexene with nitrosylchloride, for example, in liquid sulfur dioxide or a halogenated hydrocarbon such as trichlorethylene, carbon tetrachloride, chloroform or methylene chloride as solvents.

The bis(2-chloro-1-nitrosocyclohexane) thus obtained consists of two isomers (the trans-form and the cis-form) and either isomer or a mixture thereof is readily employed as the starting material of this invention.

When bis(2-chloro-1-nitrosocyclohexane) is produced by means of the above mentioned methods, a small amount of 2-chloro-1-nitrosocyclohexane (monomeric form) is also obtained as a by-product. This monomeric form forms α-aminocyclohexanone oxime by an amination reaction of this invention. Therefore, it is not necessary to separate the monomeric form from the starting material of this invention thus obtained. However, if the content of the monomeric form in the starting material is greater than a tenth part in a molar ration, it may be preferred to decrease its content by refining in order to obtain satisfactory results.

The amount of ammonia used in the reaction is a very important factor according to this invention.

Theoretically, it should be 2 moles per mole of bis(2-chloro-1-nitrosocyclohexane). However, though 10 moles of ammonia to 1 mole of bis(2-chloro-1-nitrosocyclohexane) are used in this reaction, the yield of α-aminocyclohexanone oxime is at most 40%. Further, there is the disadvantage that α-aminocyclohexanone oxime having a secondary amino group is produced as by-product in a comparatively high ratio, and the formation of octahydrophenazine is caused in this reaction. Since the octahydrophenazine is a stable compound, it is difficult to convert it to other useful compounds. Further, since this compound is weakly basic, it is difficult to separate it from the resulting reaction mixture when the starting material for producing α-amino acid contains such a compound.

However, suprisingly, when ammonia is used in a molar proportion of at least about 20 times the bis(2-chloro-1-nitrosocyclohexane), the undesirable effects are remarkably reduced. Indeed, the molar quantity of ammonia should be at least about 20 times but preferably at least about 100 times the molar quantity of bis(2-chloro-1-nitrosocyclohexane). The maximum amount of ammonia is limited only by economic considerations and may be up to 1000 moles/mole or even above.

Solvent is preferable but it may or may not be used in this invention. Water, lower alkyl alcohols such as methyl alcohol, ethyl alcohol and iso-propyl alcohol, cyclic ethers such as ethylene oxide, tetrahydrofuran and dioxane, hydrocarbons such as cyclohexene and cyclohexane and mixtures thereof are preferred. 0 to 200 parts by mole of solvent based on 1 part by mole of bis(2-chloro-1-nitrosocyclohexane) are preferred.

Salts of hydroxylamine with mineral acids used in this invention may include the salts thereof with sulfuric acid, hydrochloric acid, phosphoric acid and carbonic acid.

These salts are used in a molar proportion of about 2 - 0.001 mol, preferably, 1 - 0.001 mole per mole of the bis(2-chloro-1-nitrosocyclohexane).

In this invention, the reaction temperature should be within the range from about 40°C. to 100°C. When it is lower than 40°C., the reaction velocity becomes too low for an industrial practice, and when it is higher than 100°C., a relatively large amount of the by-product, that is, octahydrophenazine is formed, although the reaction velocity becomes extremely high.

The reaction of this invention should be carried out under pressure. Otherwise it is very difficult in industrial practice from the economic point of view to provide the necessary amount of ammonia in the reaction system.

In this invention, the nature of the particular reaction vessel is not critical. Conventional reaction vessels for carrying out chemical reactions under pressure may be used. For example, an autoclave or a pipe-reactor can be employed.

The reaction may be carried out either batchwise or in a continuous manner. It is preferable industrially to carry out the reaction continuously, using a pipe reactor.

The reaction time is not limited critically, but is normally carried out in about 15 minutes to 2 hours.

According to this invention, the process for producing α-aminocyclohexanone oxime can be practiced very simply in comparison to other well known kmethods, and α-primary aminocyclohexanone oxime can be obtained with a higher yield.

This invention can be particularly advantageously applied for a bis(2-chloro-1-nitrosocyclohexane) obtained by reacting cyclohexene with nitrosylchloride in liquid sulfur dioxide.

According to our determinations, bis(2-chloro-1-nitrosocyclohexane) can be obtained most preferably by reacting cyclohexene with nitrosylchloride using liquid sulfur dioxide as solvent. Usually crude bis(2-chloro-1-nitrosocyclohexane) thus obtained contains a minor amount of by-products which are unstable to heat, and liquid sulfur dioxide, as impurities.

In general, liquid sulfur dioxide as an impurity is removed by heating the crude bis(2-chloro-1-nitrosocyclohexane) to a relatively low temperature, because the thermally unstable by-products turn to oily materials which render the yield of the amination reaction lower, when a high temperature is employed in removing the liquid sulfur dioxide.

However, complete removal of the liquid sulfur dioxide cannot be attained when it is carried out at a relatively low temperature. Therefore, it is necessary and important to make use of a bis(2-chloro-1-nitrosocyclohexane) containing a small amount of sulfur dioxide as an impurity therein, without trouble.

According to our findings, a small amount of sulfur dioxide present in a bis(2-chloro-1-nitrosocyclohexane) reduces the yield between the latter and ammonia to a considerable degree; according to this invention this disadvantage can be eliminated by providing a mineral acid salt of hydroxylamine in the reaction system.

Accordingly, according to this invention the step of preparing a bis(2-chloro-1-nitrosocyclohexane) by reacting cyclohexene with nitrosylchloride in liquid sulfur dioxide, and the subsequent step of obtaining α-aminocyclohexanone oxime by reacting the resulting bis(2-chloro-1-nitrosocyclohexane) with ammonia can be used satisfactorily to complete a novel and economical process for preparing α-aminocyclohexanone oxime from cyclohexene as a starting material.

Next, this invention will be described more specifically by reference to examples. However, it is understood that the scope of the claims is not intended to be limited by these examples.

COMPARATIVE EXAMPLE 1

10 grams of bis(2-chloro-1-nitrosocyclohexane) having a purity higher than 99.9%, purified by recrystallization, and 40 milliliters of cyclohexene were poured into an autoclave made of stainless steel having 500 milliliters capacity and 100 kg/cm$^2$ pressure rating, and then the autoclave was closed up.

The autoclave was cooled to −50°C. using a dry icemethanol mix and 340 milliliters of liquid ammonia (density; 0.677g/cc) were poured into the autoclave. The mixture was heated to about 70°C. and was maintained for 1 hour at this temperature under agitation.

After finishing the reaction, the liquid ammonia was removed by releasing the pressure of the autoclave.

The reaction mixture, to which 100 grams of methanol was added, was taken off from the autoclave. After the residual ammonia, cyclohexene and methanol were vaporized out under reduced pressure, 11.15 grams of solid reaction product were obtained.

It was determined on analysis of this solid reaction product that the product contained 96.59% of α-aminocyclohexanone oxime hydrochloride. This corresponds to 96.60% of the theoretical yield of α-aminocyclohexanone oxime.

COMPARATIVE EXAMPLE 2

10 grams of bis(2-chloro-1-nitrosocyclohexane) used in the comparative example 1 and 40 milliliters of cyclohexene with 0.3 grams of liquid sulfur dioxide dissolved therein were poured into the autoclave used in the comparative example 1, and then the autoclave was closed up.

The reaction was carried out in entirely the same manner as in comparative example 1.

After finishing the reaction, liquid ammonia was removed by releasing the pressure of the autoclave.

The reaction mixture, to which 100 grams of methanol was added, was taken off from the autoclave. After the residual ammonia, cyclohexene and methanol were vaporized under pressure, 11.12 grams of solid reaction product were obtained.

It was determined upon analysis of this solid reaction product that 87.76 wt% of α-aminocyclohexanone oxime hydrochloride were present. This corresponds to a 87.52% yield of α-aminocyclohexanone oxime.

EXAMPLE 1

The same method as comparative example 1 was carried out except that an additional 0.56 grams of hydroxylamine sulfate was added to the autoclave. The results were as follows:

| | |
|---|---|
| Solid reaction product: | 11.71 grams |
| Content of α-aminocyclohexanone oxime hydrochloride in the solid reaction product | 95.17 wt% |
| Yield of α-aminocyclohexanone oxime; | 99.85% |

It is apparent from these results that the yield of α-aminocyclohexanone oxime was improved extremely in comparison to that of comparative Example 1.

EXAMPLE 2

The same method as in comparative Example 2 was carried out except that an additional 1.15 grams of hydroxylamine sulfate was added. The results were as follows:

| | |
|---|---|
| Solid reaction product | 12.30 grams |
| Content of α-aminocyclohexanone oxime hydrochloride in the solid reaction product | 90.44 wt% |
| Yield of α-aminocyclohexanone oxime; | 99.77% |

It is apparent from these results that the yield of α-aminocyclohexanone oxime was improved extremely in comparison to comparative Example 2.

COMPARATIVE EXAMPLE 3

The same method of comparative Example 1 was used, except that crude bis(2-chloro-1-nitrosocyclohexane) having a purity of 95 percent was used. It was obtained by reacting cyclohexene with nitrosylchloride in liquid sulfur dioxide. The results are as follows:

| | |
|---|---|
| Solid reaction product: | 11.15 grams |
| Content of α-aminocyclohexanone oxime hydrochloride in the solid reaction product; | 91.23 wt% |
| Yield of α-aminocyclohexanone oxime | 96.06% |

COMPARATIVE EXAMPLE 4

The method of the comparative Example 2 was used, except that crude bis(2-chloro-1-nitrosocyclohexane) having a purity of 95 percent was used. It was obtained by reacting cyclohexene with nitrosylchloride in liquid sulfur dioxide. The results are as follows:

| | |
|---|---|
| Solid reaction product: | 11.18 grams |
| Content of α-aminocyclohexanone oxime hydrochloride in the solid reaction product; | 83.16 wt% |
| Yield of α-aminocyclohexanone oxime; | 87.87% |

EXAMPLE 3

The same method as Example 1 was used, except that a crude bis(2-chloro-1-nitrosocyclohexane) was used in the comparative Example 3, instead of purified bis(-2-chloro-1-nitrosocyclohexane). The results are as follows:

| | |
|---|---|
| Solid reaction product; | 12.21 grams |
| Content of α-aminocyclohexanone oxime hydrochloride in the solid reaction product; | 91.22 wt% |
| Yield of α-aminocyclohexanone oxime; | 96.06% |

It is apparent from these results that the yield of α-aminocyclohexanone oxime was improved extremely in comparison to that in comparative Example 3.

COMPARATIVE EXAMPLE 5

The same method of comparative example 1 was used, except the amount of liquid ammonia was changed to 170 milliliters (Run No. 1) and 57 milliliters (Run No. 2). The results are as follows:

| | Run No. 1 | Run No. 2 |
|---|---|---|
| Solid reaction product | 11.53 grams | 10.98 grams |
| Content of α-aminocyclohexanone oxime hydrochloride in the solid reaction product; | 91.86 wt% | 54.37 wt% |
| Yield of α-aminocyclohexanone oxime; | 94.99 % | 53.54% |

EXAMPLE 4

10 grams of bis(2-chloro-1-nitrosocyclohexane) used in comparative Example 1, 40 milliliters of cyclohexene, and 1.12 grams of hydroxylamine sulfate were added to the autoclave used in comparative example 1 and the autoclave was closed up.

The autoclave was cooled to −50°C. using dry ice-methanol and 170 milliliters of liquid ammonia (density; 0.677g/cc) were poured into the autoclave. The mixture was heated to about 70°C. and was maintained for 1 hour at this temperature under agitation. The results were as follows:

| | |
|---|---|
| Solid reaction product; | 12.63 grams |
| Content of α-aminocyclohexanone oxime hydrochloride in the solid reaction product; | 88.03 wt% |
| Yield of α-aminocyclohexanone oxime; | 99.72 % |

EXAMPLE 5

The method of Example 4 was used except the amount of hydroxylamine sulfate used was 2.78 grams and the amount of liquid ammonia was 57 milliliters. The results were as follows:

| | |
|---|---|
| Solids reaction product; | 13.50 grams |
| Content of α-aminocyclohexanone oxime hydrochloride in the solid | |

-Continued

| | |
|---|---|
| reaction product; | 73.58 wt% |
| Yield of α-aminocyclohexanone oxime; | 89.09 % |

This example shows that a relatively high yield of α-aminocyclohexanone oxime can be obtained in comparison with Run No. 2 of comparative example 5, in spite of the use of a small amount of ammonia.

EXAMPLE 6

The method of comparative Example 1 was carried out except that an additional 0.45 grams of hydroxylamine phosphate was introduced into the autoclave. The results were as follows:

| | |
|---|---|
| Solid reaction product; | 11.68 grams |
| Content of α-aminocyclohexanone oxime hydrochloride in the solid reaction product; | 95.43 wt% |
| Yield of α-aminocyclohexanone oxime; | 99.93 % |

It is apparent from these results that the yield of α-aminocyclohexanone oxime improved extremely in comparison to that in comparative example 1.

EXAMPLE 7

According to the method of Example 1 (except changing the amounts of ammonia and hydroxylamine sulfate used) various further runs were carried out. Table 1 which follows, shows the results.

change of the reaction temperature, various further runs were carried out. Table 2 which follows, shows the results.

TABLE 2

| Run No. | Reaction Temperature (°C.) | Solid Reaction Product | Content of α-aminocyclo-hexanone oxime hydrochloride in the solid reaction product (wt %) | Yield of α-aminocyclo-hexanone oxime (%) |
|---|---|---|---|---|
| 1 | 30 | 11.78 | 28.96 | 30.60 |
| 2 | 40 | 11.70 | 79.84 | 83.78 |
| 3 | 50 | 11.73 | 86.42 | 90.92 |
| 4 | 70 | 11.75 | 94.84 | 99.94 |
| 5 | 90 | 11.69 | 85.31 | 89.44 |
| 6 | 100 | 11.80 | 80.38 | 85.07 |
| 7 | 110 | 11.72 | 57.49 | 60.43 |

It is apparent from the results shown in Table 2 that it is advantageous to carry out the reaction at about 40°–100°C.

EXAMPLE 9

25 wt% cyclohexene slurry of bis(2-chloro-1-nitrosocyclohexane) (m.p. 150°–153°C.), liquid ammonia, and hydroxylamine sulfate were charged continuously into a pipe reactor (diameter 8mm and length 300m) maintained at 70°C. for 12 hours, at velocities of 8.64 kg/hr, 37.3 kg/hr, and 12 kg/hr, respectively. Two hours after the start, the reaction reached equilibrium.

Thereafter, the reaction mixture was continuously removed at the end of the pipe reactor at a rate of 46.06 kg. hr.

From the reaction mixture taken out for ten hours ammonia was removed and then 14.4 kilograms of methanol were poured into the resulting slurry. After the cyclohexene and methanol were removed under reduced pressure, 25.30 kilograms of solid were obtained.

TABLE 1

| Run No. | NH₃ (ml) | NH₃/bis(2-chloro-1-nitrosocyclo-hexane) (by mole) | Hydroxylamine sulfate (g) | Solid reaction product (g) | Content of α-aminocyclo-hexanone oxime hydrochloride in the solid reaction product (wt%) | Yield of α-amino-cyclohexa-none oxime (%) |
|---|---|---|---|---|---|---|
| 1 | 11.4 | 10 | 5.60 | 16.72 | 32.58 | 48.54 |
| 2 | 22.8 | 20 | 4.48 | 15.61 | 51.04 | 71.45 |
| 3 | 57 | 50 | 2.78 | 13.93 | 71.47 | 89.29 |
| 4 | 114 | 100 | 2.24 | 13.39 | 83.24 | 99.96 |
| 5 | 170 | 150 | 1.12 | 12.58 | 88.56 | 99.92 |
| 6 | 340 | 300 | 0.56 | 11.75 | 94.87 | 99.97 |

It is apparent from the results shown in Table 1 that the molar ratio of ammonia to bis(2-chloro-1-nitrosocyclohexane) must be more than 20, preferably more than 50.

EXAMPLE 8

According to the method of the Example 1, but with

The results of the analysis of the reaction product thus obtained are as follows.

| | |
|---|---|
| Solid reaction product: | 25.30 kg |
| Content of α-aminocyclohexanone oxime hydrochloride in the solid reaction product: | 95.18 wt% |
| Yield of α-aminocyclohexanone oxime: | 99.95 % |

The following is claimed:

1. A method for producing an α-aminocyclohexanone oxime, which comprises reacting a bis(2-chloro-1-nitrosocyclohexane) with ammonia in the presence of a mineral acid salt of hydroxylamine, wherein the molar proportion of ammonia to bis(2-chloro-1-nitrosocyclohexane) is at least about 20 to 1 and said reaction is carried out at about 40–100°C. under pressure.

2. The method according to claim 1, wherein the amount of said salt of hydroxylamine is within the range from about 2 moles to 0.001 moles based upon the moles of bis(2-chloro-1-nitrosocylohexane).

3. The method according to claim 1, wherein the reaction is carried out in the presence of a solvent selected from the group consisting of lower alkyl alcohols, cyclic ethers, water, mixtures thereof, and hydrocarbons.

4. The method according to claim 1, wherein the mineral acid is selected from the group consisting of sulfuric, hydrochloric, phosphoric and carbonic acids.

5. The method according to claim 1, wherein the bis(2-chloro-1-nitrosocyclohexane) contains a small amount of sulfur dioxide as an impurity.

* * * * *